United States Patent
Brantingham et al.

(10) Patent No.: US 10,148,032 B1
(45) Date of Patent: Dec. 4, 2018

(54) SEALED ELECTRICAL CONNECTOR ASSEMBLY AND WIRE SEAL

(71) Applicant: Delphi Technologies, Inc., Troy, MI (US)

(72) Inventors: Duane L. Brantingham, Cortland, OH (US); Klara P. Carbone, Cortland, OH (US); Eric E. Shasteen, Salem, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/614,012

(22) Filed: Jun. 5, 2017

(51) Int. Cl.
*H01R 13/52* (2006.01)
*F16L 5/10* (2006.01)
*H01R 33/965* (2006.01)

(52) U.S. Cl.
CPC ............ *H01R 13/5205* (2013.01); *F16L 5/10* (2013.01); *H01R 13/52* (2013.01); *H01R 13/5202* (2013.01); *H01R 13/5219* (2013.01); *H01R 13/5221* (2013.01); *H01R 33/965* (2013.01)

(58) Field of Classification Search
CPC ............... H01R 13/52; H01R 13/5202; H01R 13/5205; H01R 13/5221; H01R 13/5219; H01R 33/965
USPC ......................................... 439/271, 586, 587
See application file for complete search history.

(56) References Cited

U.S. PATENT DOCUMENTS

| | | | |
|---|---|---|---|
| 4,735,581 A | 4/1988 | Endo et al. | |
| 4,895,533 A | 7/1990 | Yagi et al. | |
| 5,145,410 A * | 9/1992 | Maejima | H01R 13/5208 439/274 |
| 5,613,868 A * | 3/1997 | Ohsumi | H01R 13/5221 439/275 |
| 7,118,416 B2 | 10/2006 | Montena et al. | |
| 7,318,758 B2 | 1/2008 | Haller | |
| 8,337,244 B2 * | 12/2012 | Sawamura | H01R 13/5208 439/271 |

(Continued)

FOREIGN PATENT DOCUMENTS

| | | |
|---|---|---|
| DE | 19828482 A1 | 12/1999 |
| DE | 102005057952 A1 | 6/2007 |
| DE | 102007034817 A1 | 1/2009 |

OTHER PUBLICATIONS

Wikipedia, "Glass-filled Polymer", May 9, 2017, p. 1-2.*
Shin-Etsu, "Characteristic properties of Silicon Rubber Compounds", Aug. 2016, p. 1-16.*

*Primary Examiner* — Abdullah Riyami
*Assistant Examiner* — Justin Kratt
(74) *Attorney, Agent, or Firm* — Robert J. Myers

(57) ABSTRACT

A seal that is configured to engage an elongate element, such as a wire cable, and a cavity wall is presented. The seal includes a seal body that is formed of a compliant material such as a silicone rubber. The seal has an outer surface that engages the cavity surface. The seal body defines a gallery extending therethrough and surrounded by an inner surface of the seal body. The seal body has a forward surface extending from a forward edge of the outer surface to a forward edge of the inner surface and a rearward surface extending from a rearward edge of the outer surface to a rearward edge of the inner surface. The seal further includes a support element formed of a rigid material, such as glass filled polyester or NYLON, extending through the seal body in a direction substantially parallel to the inner surface.

16 Claims, 8 Drawing Sheets

(56) References Cited

U.S. PATENT DOCUMENTS

| | | |
|---|---|---|
| 9,178,301 B2 | 11/2015 | Shiga |
| 9,515,472 B2 | 12/2016 | Muehlmichel et al. |
| 9,577,367 B2 | 2/2017 | Campbell et al. |
| 2004/0080119 A1 | 4/2004 | Goll |
| 2006/0019535 A1 | 1/2006 | Fukushima et al. |
| 2011/0111627 A1 | 5/2011 | Sawamura |
| 2016/0240957 A1 | 8/2016 | Ludwig et al. |

* cited by examiner

SEALED ELECTRICAL CONNECTOR ASSEMBLY AND WIRE SEAL

TECHNICAL FIELD OF THE INVENTION

The present invention relates to a sealed electrical connector and particularly to a wire seal for sealing an electric cable in a terminal cavity of a connector housing.

BACKGROUND OF THE INVENTION

In many applications, it is necessary to mount electrical cables to terminals or connector housings and to seal the connection against environmental contaminants, such as moisture, dust, etc. To this end so-called single wire seals are known in the art, which are arranged onto the cable sheath and which provide a seal between the cable and inner walls of the terminal or the connector housing.

A typical prior art document dealing with elastic single wire seals is U.S. Pat. No. 4,895,533. This document discloses a waterproof plug for a connector. The waterproof plug comprises a rubber plug having an outer tube portion capable of fitting to an inner wall of a connector housing, a stabilizing tube rigidity mounted next to the outer tube portion of said rubber plug, and an electric wire inserting hole in the central portion thereof. A further typical prior art document dealing with elastic single wire seals is German Patent No. DE19828482 A1. This document discloses a single wire seal for sealing a gap between a conductor and a connector housing. A reinforcement region is joined to a sealing region of a sealing body. Further, reinforcement ribs are connected on a first side to a hollow cylindrical base of the reinforcement region, and on an adjacent second side to a sealing lip.

Lateral compression of the seal is necessary for forming a seal between the wire cable and the connector housing. However, such a cable seal can also be longitudinally compressed causing unwanted movement of the terminal in the connector housing that can cause intermittent electrical disconnection and/or fretting corrosion of the terminal. Therefore, a cable seal that reduces or eliminates longitudinal compression while still allowing lateral compression remains desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, an seal configured to engage an elongate element, e.g. a wire cable, and a cavity wall, e.g. within a connector body, is provided. The seal includes a seal body that is formed of a compliant material. The seal has an outer surface that is configured to sealingly engage the cavity wall. The seal body defines a gallery which extends through the seal body along a longitudinal axis that is surrounded by an inner surface of the seal body. The seal body further includes a forward surface that extends from a forward edge of the outer surface to a forward edge of the inner surface. The seal body also includes a rearward surface extending from a rearward edge of the outer surface to a rearward edge of the inner surface. The seal further includes a support element that is formed of a rigid material and extends through the seal body in a direction that is substantially parallel to the longitudinal axis.

The rigid material may be a rigid polymeric material having a Shore A durometer value in a range of 75 to 85, e.g. a glass-filled polyester or glass-filled polyamide material. The compliant material may be a complaint polymeric material having a Shore A durometer value in a range of 45 to 55, such as a silicone rubber. The rigid material forming the support element may have a Shore A durometer value that is at least 20 points higher than the compliant material forming the seal body.

The seal body and the gallery may each be characterized as having a generally cylindrical shape about the longitudinal axis. The support element may be characterized as having a generally cylindrical shape. A mesial portion of the support element may define a circumferential ridge or a circumferential groove.

The seal may have a plurality of support elements that are radially arranged about the longitudinal axis. The plurality of support elements may be arranged equidistant from the longitudinal axis. Each support element in the plurality of support elements may be arranged equidistant from two adjacent support elements in the plurality of support elements.

The support element may extend only from the forward surface to the rearward surface. Alternatively, a first portion of the support element extends beyond the forward surface, a second portion of the support element is between the forward and the rearward surfaces, and a third portion of the support element extends beyond the rearward surface. The first and third portions have a diameter greater than the second portion. The first, second, and third portions may each be characterized as having a generally cylindrical shape. The first portion may have a rounded forward edge and the third portion may have a rounded rearward edge.

In accordance with another embodiment of the invention, an electrical connector assembly is provided. The electrical connector assembly includes the deal described above and a connector housing defining a terminal cavity and a seal cavity in commutation with the terminal cavity. The seal cavity defines the cavity wall. The seal is received within the seal cavity and the outer surface sealingly engages the cavity wall. The electrical connector assembly also includes a wire cable having an end terminated by an electrical terminal and received within the terminal cavity. The inner surface sealingly engages the wire cable. The electrical connector assembly further includes a seal retainer attached to the connector housing configured to secure the seal within the seal cavity.

In a preferred embodiment, the seal cavity defines a forward wall having an opening allowing access to the terminal cavity. The support element may be configured to contact the forward wall and the seal retainer.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
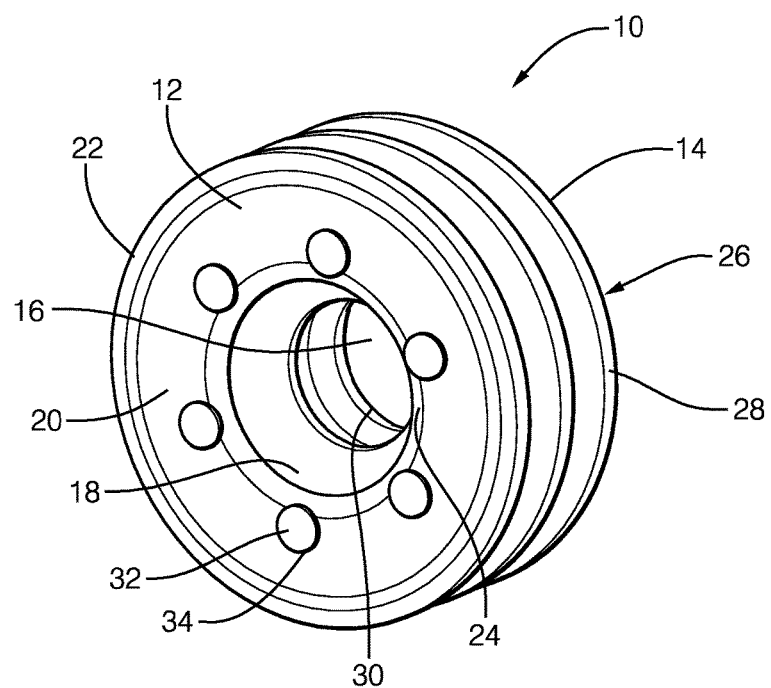
FIG. 1 is a perspective view of a seal in accordance with one embodiment.

FIG. 1 illustrates a non-limiting example of a seal 10 that sealably engages an elongate element, such as a wire cable, and a cavity wall, such as a cavity within an electrical connector housing. As used herein, sealably engage means to inhibit the passage of a liquid, solid or gas therebetween. It does not necessarily mean that a hermitic seal is formed. The seal 10 includes a seal body 12 formed of a compliant material, e.g. a silicone based rubber. An outer surface 14 of the seal 10 sealingly engages the cavity wall. The seal body 12 defines a gallery 16 that extends through the seal body 12 along a longitudinal axis X. The gallery 16 is surrounded by an inner surface 18 of the seal body 12 that sealingly engages the elongate body. The seal body 12 defines a forward surface 20 that extends from a forward edge 22 of the outer surface 14 to a forward edge 24 of the inner surface 18 and a rearward surface 26 extending from a rearward edge 28 of the outer surface 14 to a rearward edge 30 of the inner surface 18. The seal 10 further includes a plurality of a support elements 32 that are sealingly engaged with the seal body 12. The support elements 32 each have a generally cylindrical shape and are disposed in cylindrical passages 34 extending through the seal body 12 that are radially arranged about the longitudinal axis X. The support elements 32 are arranged equidistant from the longitudinal axis X and equidistant from the two adjacent support elements 32 in the plurality of support elements. The support elements 32 are formed of a rigid material, e.g. 30% glass filled polyester or 30% glass filled polyamide (NYLON). The support elements 32 extend through the seal body 12 in a direction that is substantially parallel to the inner surface 18. The seal body 12 and the gallery 16 each have a generally cylindrical shape about the longitudinal axis X. Each support element 32 may define a circumferential groove or ridge (not shown) to inhibit the support element 32 from being pushed out of the passage 34. Each support element 32 extends only from the forward surface 20 of the seal body 12 to the rearward surface 26 of the seal body 12. The outer surface and the inner surface define complaint ribs configured to engage the cavity wall and elongate element respectively.

The support elements 32 may be inserted within the seal body 12 after the seal body 12 is molded or may be co-molded with the seal body 12 in a second shot process.

The rigid material that forms the compliant material that forms the seal body 12 has a Shore A durometer value in the range of 45 to 55 while the support elements 32 have a Shore A durometer value that is in the range of 75 to 85. The Shore A durometer value of the rigid material is preferably at least 20 points higher than the Shore A durometer value of the compliant material.

Figure 2:
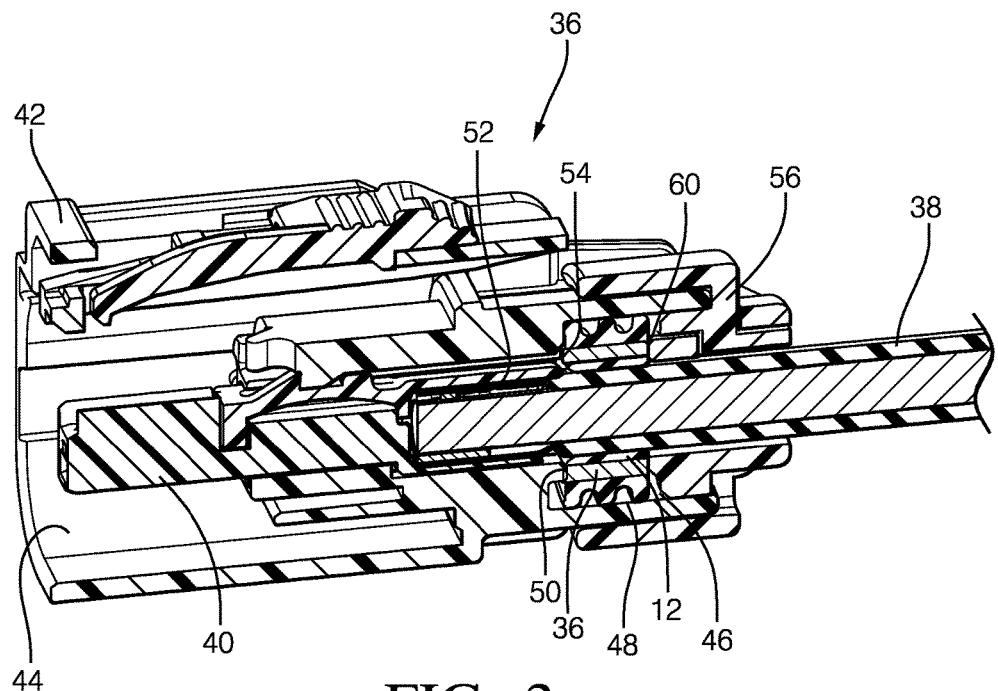
FIG. 2 is a cross section perspective view of an electrical cable assembly including the seal of FIG. 1 in accordance with one embodiment.
Figure 3:
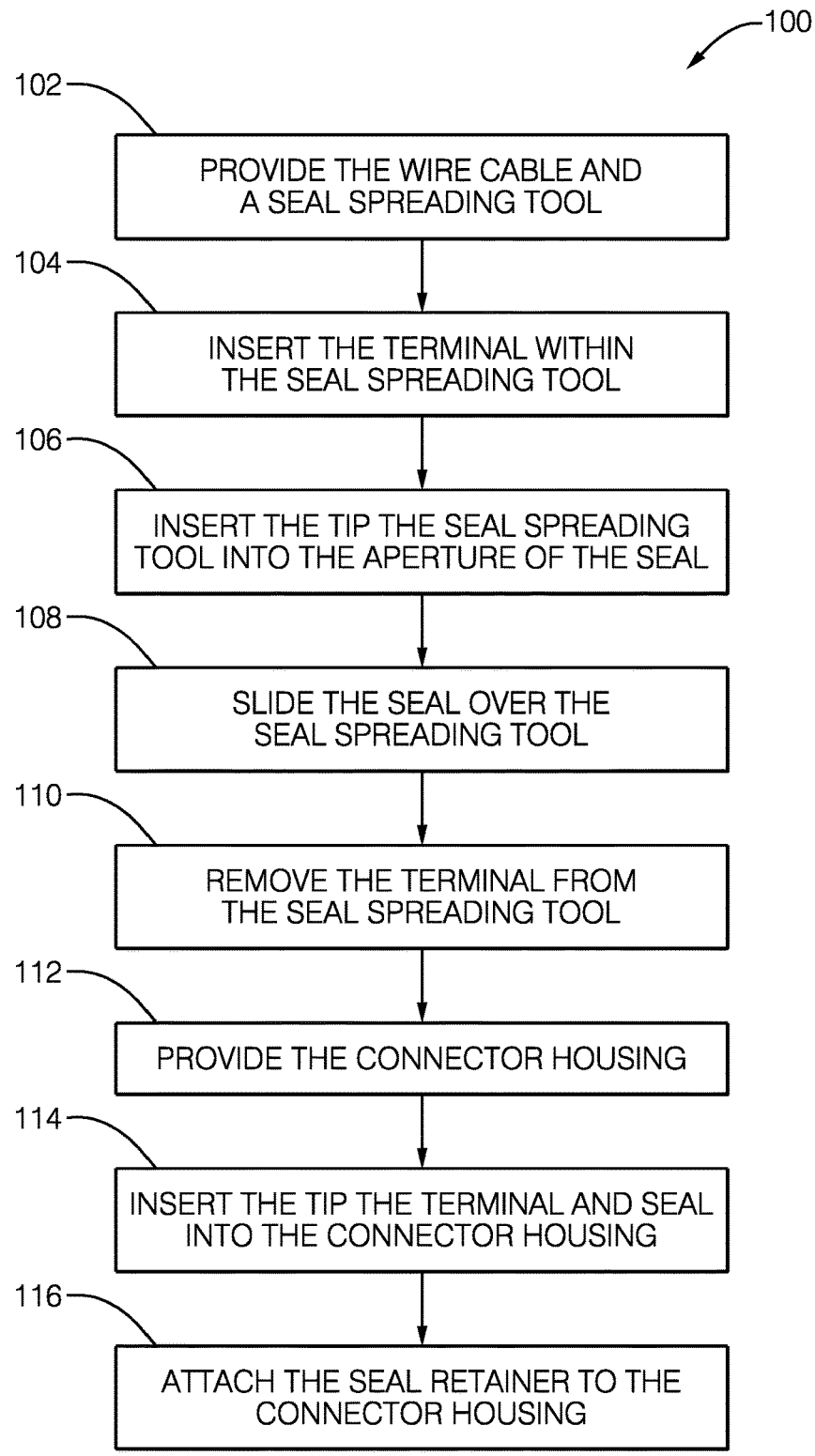
FIG. 3 is a flow chart of the process of assembling the electrical cable assembly of FIG. 2 in accordance with one embodiment.

FIG. 2 illustrates a non-limiting example of an electrical connector assembly 36 incorporating the seal 10 shown in FIG. 1 and described above. The electrical connector assembly 36 includes a wire cable 38 with an insulative jacket having an end terminated by an electrical terminal 40 and the seal 10 surrounding a portion of insulative jacket of the wire cable 38. The inner surface 18 of the seal 10 sealingly engages the wire cable 38. The electrical connector assembly 36 also includes a connector housing 42 formed of an insulative material such as polybutylene terephthalate (PBT) or polyamide (NYLON) that defines a terminal cavity 44 in which the electrical terminal 40 of the wire cable 38 is received and a seal cavity 46 in commutation with the terminal cavity 44 in which the seal 10 is received. As illustrated here, the terminal 40 is contained within an intermediate housing that is inserted within the terminal cavity 44. The seal cavity 46 defines the cavity wall 48 and the outer surface 14 sealingly engages the cavity wall 48. The seal cavity 46 defines a forward wall 50 having an opening 52 allowing access to the terminal cavity 44. The forward end 54 of the support element 32 contacts this forward wall 50 as the seal 10 is inserted within the seal cavity 46. The electrical connector assembly 36 also includes a seal retainer 56 that is attached to the connector housing 42 by a pair of snap fittings 58. This seal retainer 56 is secures the seal 10 within the seal cavity 46. The rearward end 60 of the support element 32 contacts the seal retainer 56.

Figure 4:
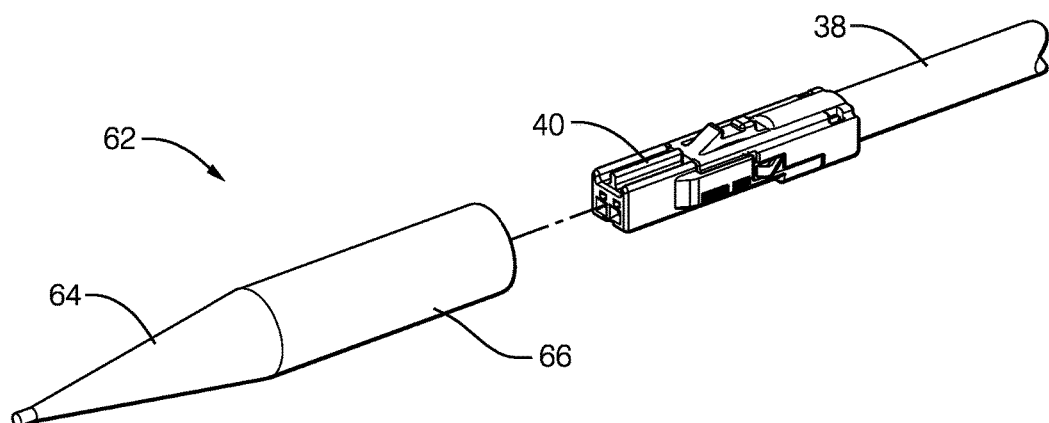
FIGS. 4 through 15 are illustrations of the process of assembling the electrical cable assembly of FIG. 3 in accordance with one embodiment.
Figure 5:
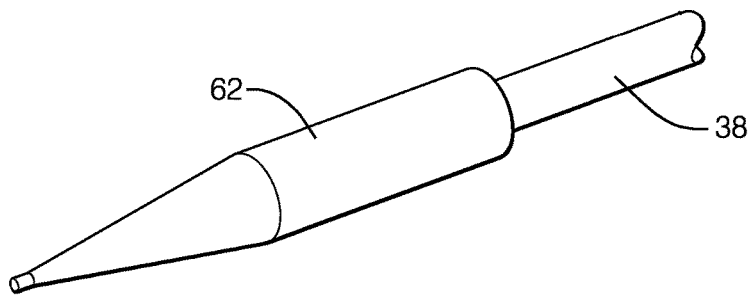
Figure 6:
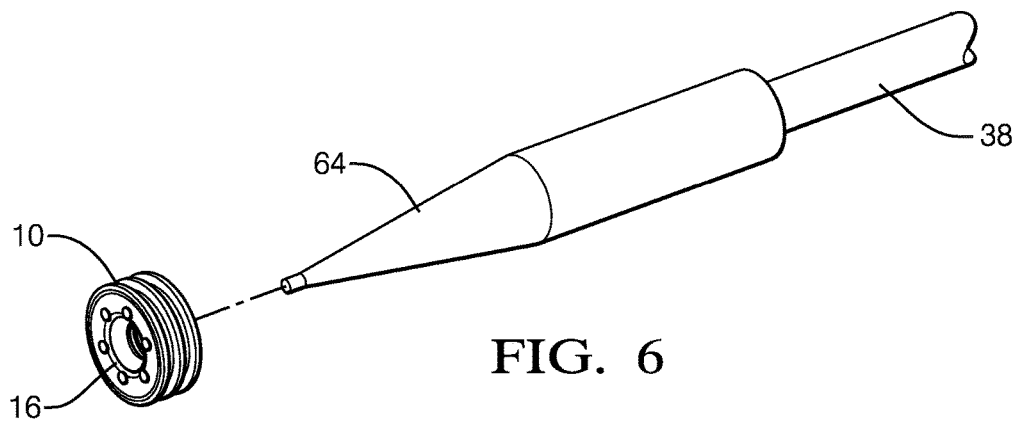
Figure 7:
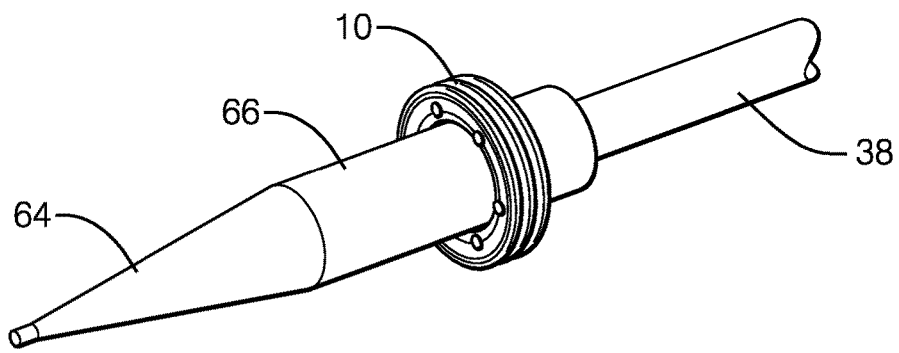
Figure 8:
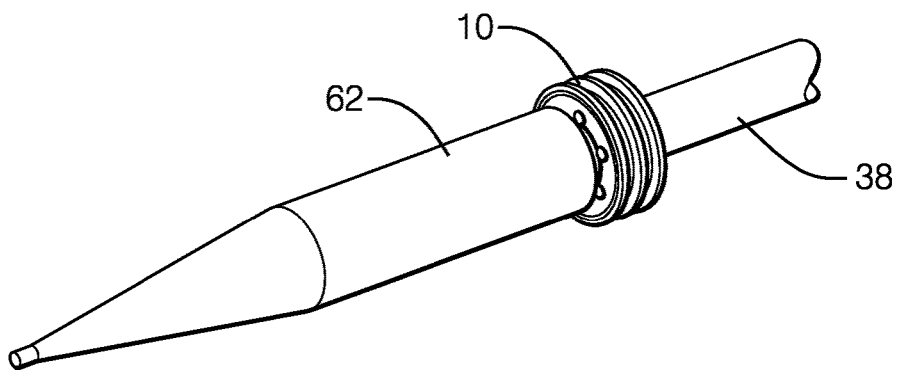
Figure 9:
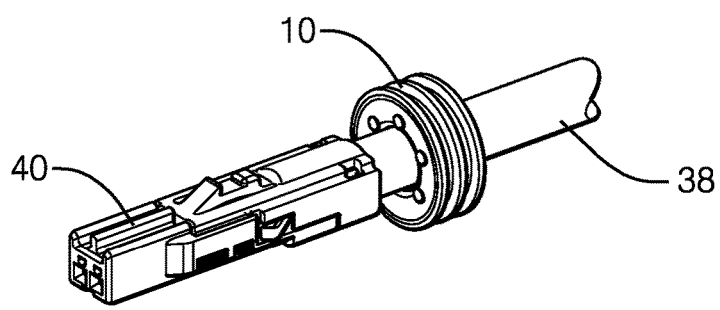
Figure 10:
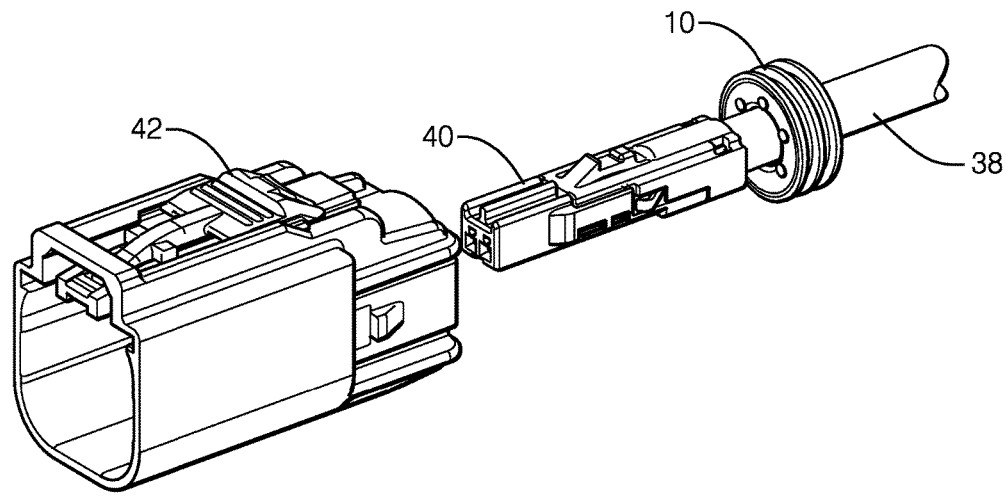
Figure 11:
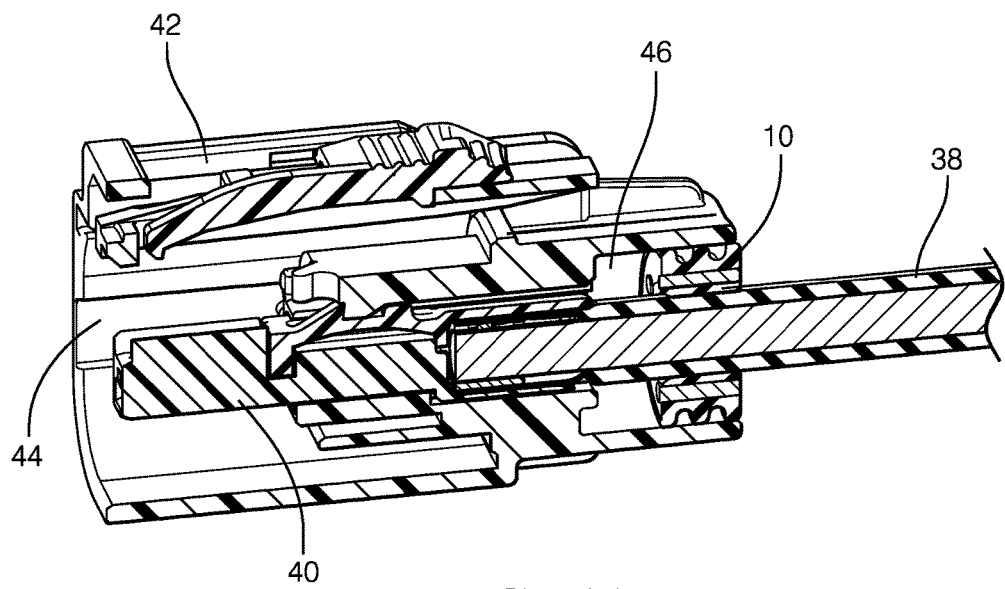
Figure 12:
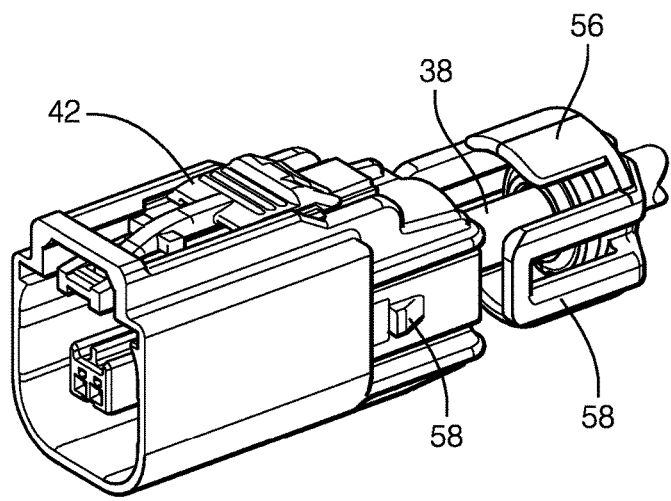
Figure 13:
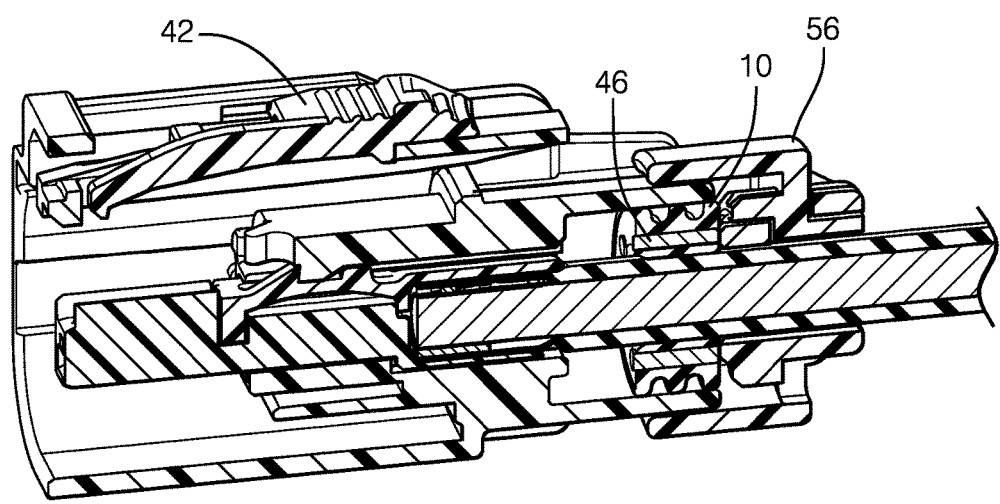
Figure 14:
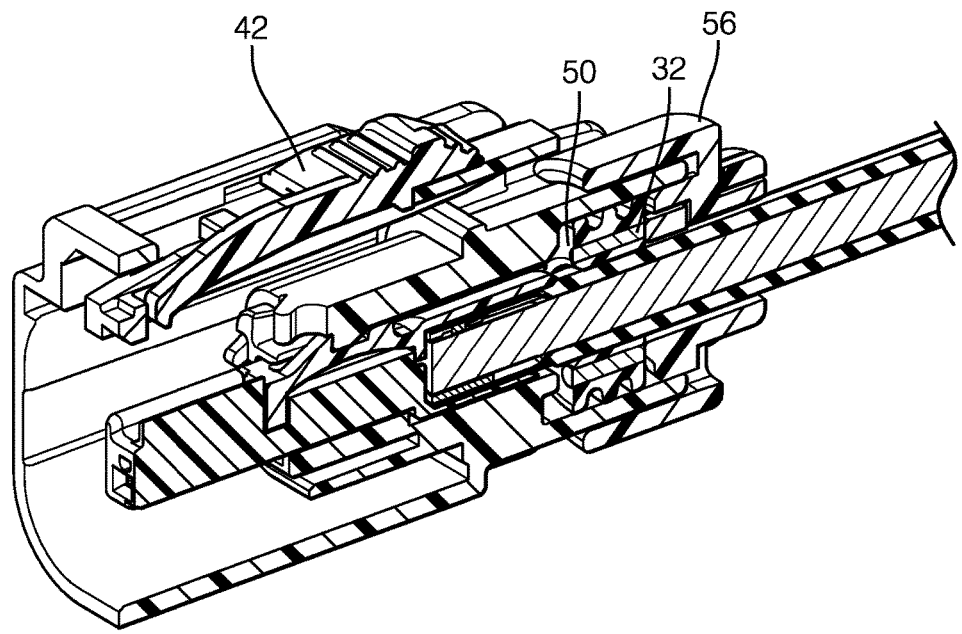
Figure 15:
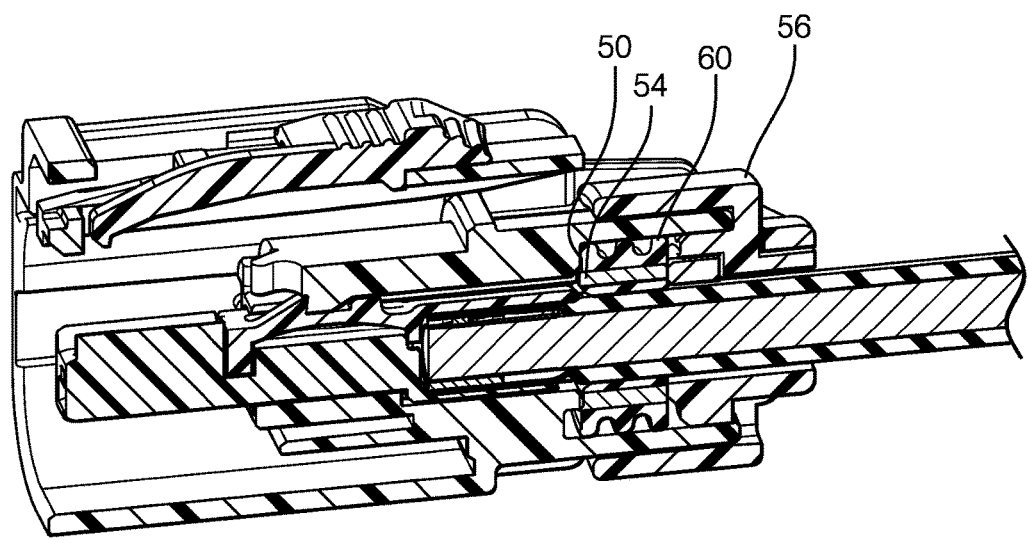

FIGS. 3-15 illustrate and describe a non-limiting example process 100 of assembling the electrical connector assembly 36 shown in FIG. 2. The process 100 includes the steps of:

STEP 102, PROVIDE THE WIRE CABLE AND A SEAL SPREADING TOOL, includes providing the wire cable 38 and a seal spreading tool 62 as shown in FIG. 4. The seal spreading tool 62 has a conical tip 64 and a cylindrical body 66 defining a tool cavity (not shown) in which the electrical terminal 40 of the wire cable 38 is received;

STEP 104, INSERT THE TERMINAL WITHIN THE SEAL SPREADING TOOL, includes inserting the terminal 40 within the tool cavity of the seal spreading tool 62 as shown in FIG. 5;

STEP 106, INSERT THE TIP THE SEAL SPREADING TOOL INTO THE GALLERY OF THE SEAL, includes inserting the tip 64 of the seal spreading tool 62 into the gallery 16 of the seal 10 as shown in FIG. 6;

STEP 108, SLIDE THE SEAL OVER THE SEAL SPREADING TOOL, includes sliding the seal 10 over the conical tip 64 and cylindrical body 66 of the seal spreading tool 62 until the wire cable 38 is received within the gallery 16 and the inner surface 18 of the seal 10 sealably engages the wire cable 38 as shown in FIGS. 7 and 8. The radial arrangement of the support elements 32 around the gallery 16 allow the seal body 12 to stretch and expand the diameter of the gallery 16 over the conical tip 64;

STEP 110, REMOVE THE TERMINAL FROM THE SEAL SPREADING TOOL, includes removing the terminal 40 from the tool cavity of the seal spreading tool 62 as shown in FIG. 9;

STEP 112, PROVIDE THE CONNECTOR HOUSING, includes providing the connector housing 42 as shown in FIG. 10;

STEP 114, INSERT THE TIP THE TERMINAL AND SEAL INTO THE CONNECTOR HOUSING, includes inserting the electrical terminal 40 into the terminal cavity 44 of the connector housing 42 and inserting the seal 10 into the seal cavity 46 of the connector housing 42 such that the outer surface 14 sealingly engages the seal cavity as shown in FIG. 11; and STEP 116, ATTACH THE SEAL RETAINER TO THE CONNECTOR HOUSING, includes attaching the seal retainer 56 to the connector housing 42 as shown in FIGS. 12 through 15. The seal retainer 56 contacts the rearward ends 60 of the support elements 32 as shown in FIG. 13 and pushes the seal 10 forward in the seal cavity 46 as shown in FIG. 14 until the forward ends 54 of the support elements 32 contact the forward wall 50 of the seal cavity 46 as shown in FIG. 15.

Figure 16:
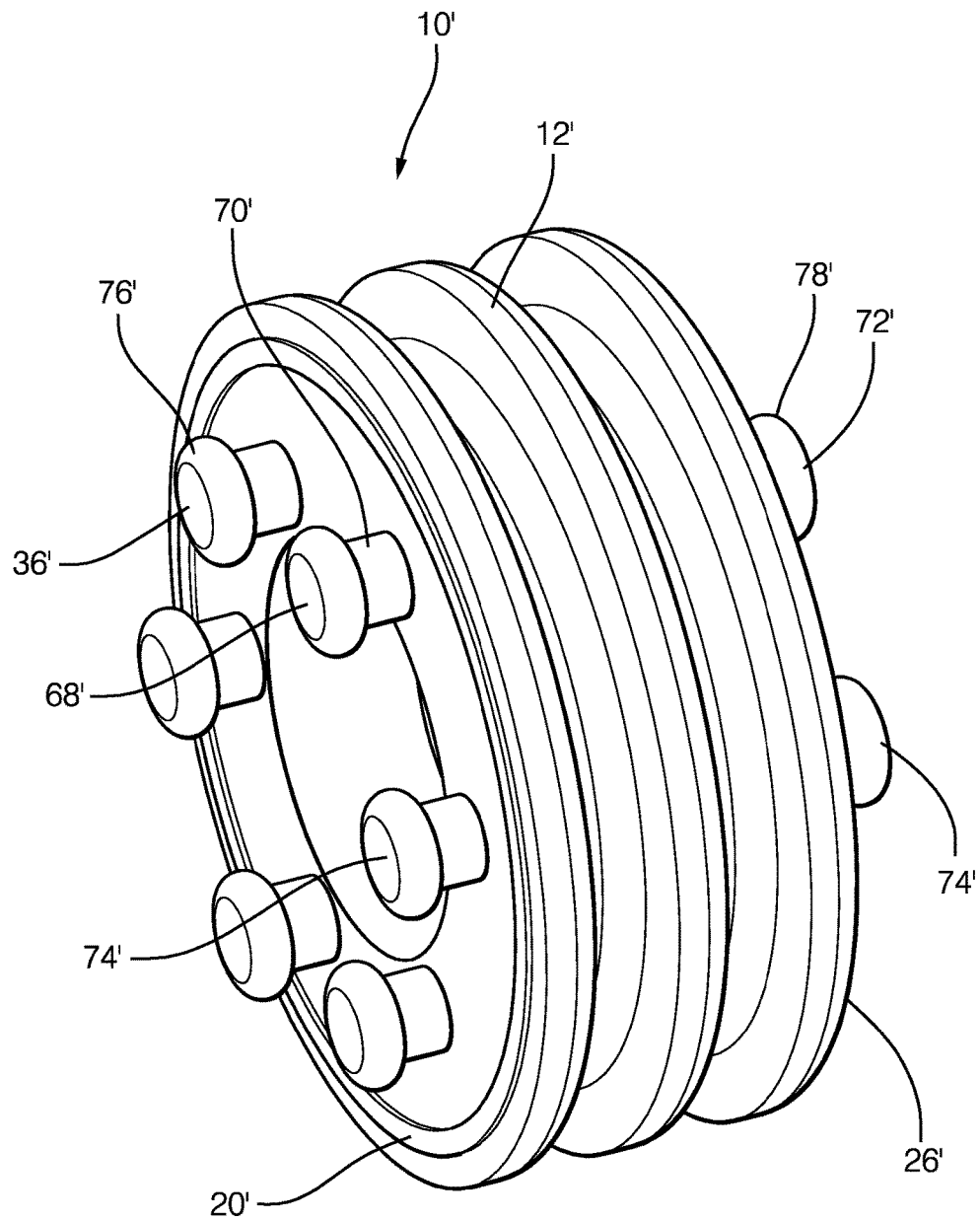
FIG. 16 is a perspective view of a seal in accordance with another embodiment.

Another non-limiting example of a seal 10' is illustrated in FIG. 16. In this seal 10', a first portion 68' of the support element 32' extends beyond the forward surface 20' of the seal body 12', a second portion 70' of the support element 32' is between the forward and the rearward surfaces 20', 26', and a third portion 72' of the support element 32' extends beyond the rearward surface 26'. The first and third portions 68', 72' have a diameter greater than the second portion 70' and extend laterally beyond the second portion 70'. The first and third portions 68', 72' form a fungiform or "mushroom shaped" head 74' that is generally cylindrical shape with a rounded forward edge 76' and a rounded rearward edge 78' respectively.

The examples presented herein are directed to electrical connector assemblies, however other embodiments of the seal may be envisioned that are adapted for use with other elongate elements, such as optical cables, pneumatic lines, and/or hydraulic lines. The seal may also be configured for use with connector housings used to interconnect any of these.

Accordingly a seal 10 having support elements 32 that resist longitudinal compression and an electrical connector assembly 36 incorporating such a seal 10 is provided. The seal 10 provides the benefit of reducing or eliminating longitudinal compression of the seal 10 thus reducing or eliminating the transmission of longitudinal vibration or displacement through the seal 10 to the terminal 40.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

We claim:

1. A seal configured to engage an elongate element and a cavity wall, said seal comprising:
 a seal body formed of a compliant material having an outer surface configured to sealingly engage the cavity wall, said seal body defining a gallery extending therethrough along a longitudinal axis surrounded by an inner surface of the seal body, wherein the seal body and the gallery are each characterized as having a generally cylindrical shape about the longitudinal axis, and wherein the seal body further comprises a forward surface extending from a forward edge of the outer surface to a forward edge of the inner surface and a rearward surface extending from a rearward edge of the outer surface to a rearward edge of the inner surface; and
 a support element formed of a rigid material extending through the seal body in a direction substantially parallel to the inner surface, wherein a first portion of the support element extends beyond the forward surface, a second portion of the support element is between the forward and the rearward surfaces, and a third portion of the support element extends beyond the rearward surface and wherein the first and third portions have a diameter greater than the second portion.

2. The seal according to claim 1, wherein the rigid material has a Shore A durometer value that is at least 20 points higher than the compliant material.

3. The seal according to claim 1 wherein the support element is characterized as having a generally cylindrical shape.

4. The seal according to claim 3, wherein the seal comprises a plurality of support elements radially arranged about the longitudinal axis.

5. The seal according to claim 4, wherein the plurality of support elements are arranged equidistant from the longitudinal axis.

6. The seal according to claim 5, wherein each support element in the plurality of support elements is arranged equidistant from two adjacent support elements in the plurality of support elements.

7. The seal according to claim 1, wherein the support element extends from the forward surface to the rearward surface.

8. The seal according to claim 1, wherein the first, second, and third portions are each characterized as having a generally cylindrical shape.

9. The seal according to claim 1, wherein the first portion has a rounded forward edge and the third portion has a rounded rearward edge.

10. The seal according to claim 1, wherein the rigid material is a rigid polymeric material having a Shore A durometer value in a range of 75 to 85.

11. The seal according to claim 10,
 wherein the rigid material is selected from a list consisting of glass-filled polyester and glass-filled polyamide.

12. The seal according to claim 11, wherein the compliant material is a compliant polymeric material having a Shore A durometer value in a range of 45 to 55.

13. The seal according to claim 12, wherein the compliant material is a silicone rubber.

14. An electrical connector assembly, comprising:
 the seal according to claim 1;
 a connector housing defining a terminal cavity and a seal cavity in communication with the terminal cavity, said seal cavity defining the cavity wall, wherein the seal is received within the seal cavity and the outer surface sealingly engages the cavity wall;
 a wire cable having an end terminated by an electrical terminal and received within the terminal cavity, wherein the inner surface sealingly engages the wire cable; and
 a seal retainer attached to the connector housing configured to secure the seal within the seal cavity.

15. The electrical connector assembly according to claim 14, wherein the seal cavity defines a forward wall having an opening allowing access to the terminal cavity and wherein the support element is configured to contact the forward wall.

16. The electrical connector assembly according to claim 15, wherein the support element is configured to contact the seal retainer.

* * * * *